(12) United States Patent
Suh et al.

(10) Patent No.: US 8,150,317 B2
(45) Date of Patent: Apr. 3, 2012

(54) METHOD AND SYSTEM FOR MANAGING MOBILITY OF AN ACCESS TERMINAL IN A MOBILE COMMUNICATION SYSTEM USING MOBILE IP

(75) Inventors: Kyung-Joo Suh, Seoul (KR); Sung-Ho Choi, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 880 days.

(21) Appl. No.: 12/125,300

(22) Filed: May 22, 2008

(65) Prior Publication Data

US 2008/0293376 A1 Nov. 27, 2008

(30) Foreign Application Priority Data

May 22, 2007 (KR) .................. 10-2007-0049963

(51) Int. Cl.
*H04L 9/00* (2006.01)
(52) U.S. Cl. .................. 455/41.2; 455/413; 455/435.1; 455/436; 455/461; 455/456.2; 370/218; 370/313; 370/327; 370/328; 370/331; 380/277; 726/1
(58) Field of Classification Search .................. 455/410, 455/13.4, 403, 411, 413, 420, 426.1, 427, 455/432.1, 435.1, 433, 436, 442, 445, 456.1, 455/461, 465, 550.1, 551, 41.2; 380/277; 370/328, 329, 331, 336, 338, 347, 353, 390, 370/395.2, 401, 218, 313, 327; 709/230, 709/225, 229
See application file for complete search history.

(56) References Cited

U.S. PATENT DOCUMENTS

| 4,833,702 | A | * | 5/1989 | Shitara et al. .................. 455/465 |
| 5,119,502 | A | * | 6/1992 | Kallin et al. .................. 455/434 |
| 5,199,031 | A | * | 3/1993 | Dahlin .......................... 370/329 |
| 5,210,787 | A | * | 5/1993 | Hayes et al. ................. 455/435.1 |
| 5,257,399 | A | * | 10/1993 | Kallin et al. .................. 455/434 |
| 5,276,680 | A | * | 1/1994 | Messenger .................... 370/311 |
| 5,278,831 | A | * | 1/1994 | Mabey et al. ................. 370/349 |
| 5,305,466 | A | * | 4/1994 | Taketsugu ................. 455/435.1 |
| 5,315,637 | A | * | 5/1994 | Breeden et al. ............. 455/435.1 |
| 5,321,735 | A | * | 6/1994 | Breeden et al. ............. 455/406 |
| 5,325,419 | A | * | 6/1994 | Connolly et al. .......... 455/435.1 |
| 5,335,262 | A | * | 8/1994 | Oguchi et al. ............. 455/432.1 |
| 5,440,613 | A | * | 8/1995 | Fuentes ........................ 455/436 |

(Continued)

FOREIGN PATENT DOCUMENTS

JP 2006-262352 9/2006

(Continued)

*Primary Examiner* — William D Cumming
(74) *Attorney, Agent, or Firm* — The Farrell Law Firm, P.C.

(57) ABSTRACT

A method for managing mobility of an AT in a mobile communication system using Mobile IPv4. The AAA and the AT generate a first key for mutual authentication between the AT and a HA, and the AAA and the AG generate a second key for mutual authentication between the AG and the HA. The AG generates a third key for mutual authentication between the AG and the AT. The AT acquires a CoA that it will use in a foreign network. The AT sends an RRQ message to the AG. The AG verifies the RRQ message received from the AT, using a third authentication key. The AG then sends to the HA an RRQ message. The HA verifies the AT and the AG, and allocates an HoA of the AT. The HA sends an RRP message including the allocated HoA of the AT in response to the RRQ message.

10 Claims, 5 Drawing Sheets

U.S. PATENT DOCUMENTS

| | | | |
|---|---|---|---|
| 5,475,735 A * | 12/1995 | Williams et al. | 455/403 |
| 5,483,672 A * | 1/1996 | Sasuta | 455/509 |
| 5,491,741 A * | 2/1996 | Farwell et al. | 370/347 |
| 5,519,706 A * | 5/1996 | Bantz et al. | 455/435.2 |
| 5,583,918 A * | 12/1996 | Nakagawa | 455/409 |
| 5,588,043 A * | 12/1996 | Tiedemann et al. | 455/435.1 |
| 5,594,945 A * | 1/1997 | Lewis et al. | 340/7.27 |
| 5,613,208 A * | 3/1997 | Blackman et al. | 455/434 |
| 5,621,784 A * | 4/1997 | Tiedemann et al. | 455/435.1 |
| 5,629,975 A * | 5/1997 | Tiedemann et al. | 455/435.1 |
| 5,640,443 A * | 6/1997 | Kamura | 455/433 |
| 5,642,398 A * | 6/1997 | Tiedemann et al. | 455/426.1 |
| 5,649,301 A * | 7/1997 | Yabusaki et al. | 455/433 |
| 5,657,375 A * | 8/1997 | Connolly et al. | 455/436 |
| 5,666,652 A * | 9/1997 | Lin et al. | 455/435.1 |
| 5,675,629 A * | 10/1997 | Raffel et al. | 455/552.1 |
| 5,732,350 A * | 3/1998 | Marko et al. | 455/435.1 |
| 5,734,977 A * | 3/1998 | Sanmugam | 455/410 |
| 5,805,994 A * | 9/1998 | Perreault et al. | 455/435.1 |
| 5,819,041 A * | 10/1998 | Bilgic | 709/221 |
| 5,828,958 A * | 10/1998 | Ishida et al. | 455/433 |
| 5,862,452 A * | 1/1999 | Cudak et al. | 725/81 |
| 5,862,481 A * | 1/1999 | Kulkarni et al. | 455/432.2 |
| 5,884,172 A * | 3/1999 | Sawyer | 455/435.1 |
| 5,898,923 A * | 4/1999 | Gaasvik et al. | 455/434 |
| 5,911,120 A * | 6/1999 | Jarett et al. | 455/417 |
| 5,913,164 A * | 6/1999 | Pawa et al. | 455/427 |
| 5,940,512 A * | 8/1999 | Tomoike | 380/248 |
| 5,940,758 A * | 8/1999 | Chavez et al. | 455/432.2 |
| 5,956,639 A * | 9/1999 | Armbruster et al. | 455/431 |
| 5,978,669 A * | 11/1999 | Sanmugam | 455/410 |
| 5,983,102 A * | 11/1999 | Gozes | 455/432.1 |
| 6,002,931 A * | 12/1999 | Yamaguchi et al. | 455/433 |
| 6,006,084 A * | 12/1999 | Miller et al. | 455/406 |
| 6,018,666 A * | 1/2000 | Chavez, Jr. | 455/465 |
| 6,035,194 A * | 3/2000 | Mattila | 455/434 |
| 6,041,234 A * | 3/2000 | Oksanen et al. | 455/434 |
| 6,058,106 A * | 5/2000 | Cudak et al. | 370/313 |
| 6,058,305 A * | 5/2000 | Chavez, Jr. | 455/426.1 |
| 6,072,986 A * | 6/2000 | Blanchard et al. | 455/13.4 |
| 6,088,591 A * | 7/2000 | Trompower et al. | 455/438 |
| 6,108,544 A * | 8/2000 | Dorenbosch et al. | 340/7.27 |
| 6,112,087 A * | 8/2000 | Tayloe | 455/435.2 |
| 6,128,509 A * | 10/2000 | Veijola et al. | 455/556.1 |
| 6,134,438 A * | 10/2000 | Sawyer | 455/433 |
| 6,137,791 A * | 10/2000 | Frid et al. | 370/352 |
| 6,138,019 A * | 10/2000 | Trompower et al. | 455/436 |
| 6,141,533 A * | 10/2000 | Wilson et al. | 455/11.1 |
| 6,148,205 A * | 11/2000 | Cotton | 455/435.1 |
| 6,157,633 A * | 12/2000 | Wright | 370/349 |
| 6,167,250 A * | 12/2000 | Rahman et al. | 455/406 |
| 6,169,893 B1 * | 1/2001 | Shaheen et al. | 455/414.1 |
| 6,173,182 B1 * | 1/2001 | Cha | 455/435.1 |
| 6,178,325 B1 * | 1/2001 | Hazama | 455/432.1 |
| 6,188,899 B1 * | 2/2001 | Chatterjee et al. | 455/435.1 |
| 6,212,176 B1 * | 4/2001 | Andersson et al. | 370/347 |
| 6,240,391 B1 * | 5/2001 | Ball et al. | 704/270 |
| 6,252,868 B1 * | 6/2001 | Diachina et al. | 370/347 |
| 6,253,081 B1 * | 6/2001 | Koster | 455/433 |
| 6,266,523 B1 * | 7/2001 | Cook et al. | 455/403 |
| 6,282,421 B1 * | 8/2001 | Chatterjee et al. | 455/435.1 |
| 6,317,605 B1 * | 11/2001 | Sakuma | 455/457 |
| 6,330,447 B1 * | 12/2001 | Hengeveld | 455/436 |
| 6,359,880 B1 * | 3/2002 | Curry et al. | 370/352 |
| 6,385,461 B1 * | 5/2002 | Raith | 455/518 |
| 6,400,701 B2 * | 6/2002 | Lin et al. | 370/336 |
| 6,418,315 B1 * | 7/2002 | Seo et al. | 455/435.1 |
| 6,430,417 B1 * | 8/2002 | Raith et al. | 455/466 |
| 6,445,925 B1 * | 9/2002 | Kwon et al. | 455/446 |
| 6,463,259 B1 * | 10/2002 | Kim | 455/3.01 |
| 6,473,411 B1 * | 10/2002 | Kumaki et al. | 370/331 |
| 6,493,550 B1 * | 12/2002 | Raith | 455/422.1 |
| 6,510,318 B1 * | 1/2003 | Minagawa | 455/435.2 |
| 6,512,924 B2 * | 1/2003 | Sawada et al. | 455/435.1 |
| 6,535,493 B1 * | 3/2003 | Lee et al. | 370/329 |
| 6,542,491 B1 * | 4/2003 | Tari et al. | 370/338 |
| 6,567,664 B1 * | 5/2003 | Bergenwall et al. | 455/435.1 |
| 6,591,101 B1 * | 7/2003 | Shimbori | 455/435.1 |
| 6,603,968 B2 * | 8/2003 | Anvekar et al. | 455/433 |
| 6,611,692 B2 * | 8/2003 | Raffel et al. | 455/552.1 |
| 6,625,135 B1 * | 9/2003 | Johnson et al. | 370/332 |
| 6,633,761 B1 * | 10/2003 | Singhal et al. | 455/436 |
| 6,650,629 B1 * | 11/2003 | Takahashi et al. | 370/335 |
| 6,650,901 B1 * | 11/2003 | Schuster et al. | 455/456.1 |
| 6,661,996 B1 * | 12/2003 | Wiedeman et al. | 455/12.1 |
| 6,665,537 B1 * | 12/2003 | Lioy | 455/435.1 |
| 6,681,118 B2 * | 1/2004 | Raffel et al. | 455/552.1 |
| 6,694,133 B1 * | 2/2004 | Tobita et al. | 455/412.1 |
| 6,721,755 B1 * | 4/2004 | Lee | 1/1 |
| 6,725,037 B1 * | 4/2004 | Grootwassink | 455/433 |
| 6,731,905 B2 * | 5/2004 | Ogino et al. | 455/11.1 |
| 6,731,933 B2 * | 5/2004 | McCormick | 455/432.1 |
| 6,735,432 B1 * | 5/2004 | Jarett et al. | 455/417 |
| 6,754,492 B1 * | 6/2004 | Stammers et al. | 455/435.1 |
| 6,782,260 B2 * | 8/2004 | Nakakita et al. | 455/435.1 |
| 6,785,552 B2 * | 8/2004 | Shinozaki et al. | 455/456.1 |
| 6,819,926 B2 * | 11/2004 | Karlsson et al. | 455/433 |
| 6,829,473 B2 * | 12/2004 | Raman et al. | 455/406 |
| 6,829,480 B1 * | 12/2004 | Hoglund et al. | 455/433 |
| 6,868,270 B2 * | 3/2005 | Dent | 455/435.1 |
| 6,879,811 B1 * | 4/2005 | Carter et al. | 455/67.11 |
| 6,904,284 B2 * | 6/2005 | Saito et al. | 455/450 |
| 6,915,132 B2 * | 7/2005 | Chatterjee et al. | 455/435.1 |
| 6,915,325 B1 * | 7/2005 | Lee et al. | 709/202 |
| 6,915,345 B1 * | 7/2005 | Tummala et al. | 709/225 |
| 6,922,561 B2 * | 7/2005 | Chen et al. | 455/435.1 |
| 6,947,737 B2 * | 9/2005 | Massie et al. | 455/426.1 |
| 6,950,415 B2 * | 9/2005 | Chang et al. | 370/331 |
| 6,954,790 B2 * | 10/2005 | Forslow | 709/227 |
| 6,956,846 B2 * | 10/2005 | Lewis et al. | 370/352 |
| 6,957,066 B1 * | 10/2005 | Stammers et al. | 455/435.1 |
| 6,973,309 B1 * | 12/2005 | Rygula et al. | 455/436 |
| 6,973,506 B2 * | 12/2005 | Ishiyama et al. | 709/245 |
| 6,975,863 B1 * | 12/2005 | Miernik | 455/434 |
| 6,975,864 B2 * | 12/2005 | Singhal et al. | 455/438 |
| 6,978,128 B1 * | 12/2005 | Raman et al. | 455/414.1 |
| 6,978,135 B2 * | 12/2005 | Sasada | 455/435.1 |
| 6,985,730 B2 * | 1/2006 | Hasegawa et al. | 455/435.1 |
| 6,987,771 B2 * | 1/2006 | Shimizu et al. | 370/401 |
| 6,990,315 B2 * | 1/2006 | Izumi | 455/41.1 |
| 7,003,295 B1 * | 2/2006 | Cook et al. | 455/435.1 |
| 7,010,303 B2 * | 3/2006 | Lewis et al. | 455/445 |
| 7,031,275 B1 * | 4/2006 | Borella et al. | 370/328 |
| 7,031,705 B2 * | 4/2006 | Grootwassink | 455/432.1 |
| 7,035,646 B2 * | 4/2006 | Raffel et al. | 455/456.1 |
| 7,043,246 B2 * | 5/2006 | Uskela | 455/445 |
| 7,058,410 B2 * | 6/2006 | Hiyama et al. | 455/456.1 |
| 7,065,354 B2 * | 6/2006 | Park et al. | 455/426.1 |
| 7,069,007 B2 * | 6/2006 | Masuda et al. | 455/433 |
| 7,072,654 B2 * | 7/2006 | Fujiwara et al. | 455/435.1 |
| 7,079,511 B2 * | 7/2006 | Abrol et al. | 370/331 |
| 7,089,003 B2 * | 8/2006 | Fingerhut et al. | 455/435.1 |
| 7,099,655 B2 * | 8/2006 | Song et al. | 455/411 |
| 7,113,509 B2 * | 9/2006 | Nakatsugawa et al. | 370/392 |
| 7,113,784 B2 * | 9/2006 | Fujiwara et al. | 455/435.1 |
| 7,116,654 B2 * | 10/2006 | Kim | 370/338 |
| 7,116,668 B2 * | 10/2006 | Sivalingham | 370/394 |
| 7,117,258 B2 * | 10/2006 | Lee et al. | 709/222 |
| 7,120,459 B2 * | 10/2006 | Sawada et al. | 455/550.1 |
| 7,123,721 B2 * | 10/2006 | Panjwani et al. | 380/270 |
| 7,127,249 B2 * | 10/2006 | Miernik | 455/435.1 |
| 7,127,522 B1 * | 10/2006 | Nakamura et al. | 709/238 |
| 7,133,672 B2 * | 11/2006 | Sayeedi | 455/432.1 |
| 7,133,678 B1 * | 11/2006 | Berkowitz et al. | 455/445 |
| 7,136,654 B1 * | 11/2006 | Onishi | 358/1.15 |
| 7,136,997 B2 * | 11/2006 | Yamaguchi et al. | 713/155 |
| 7,146,130 B2 * | 12/2006 | Hsu et al. | 455/3.04 |
| 7,149,521 B2 * | 12/2006 | Sundar et al. | 455/435.1 |
| 7,151,923 B2 * | 12/2006 | Boland et al. | 455/412.2 |
| 7,158,497 B2 * | 1/2007 | Li et al. | 370/331 |
| 7,158,787 B2 * | 1/2007 | Backes | 455/435.2 |
| 7,162,260 B2 * | 1/2007 | Shoji et al. | 455/507 |
| 7,177,628 B2 * | 2/2007 | Sommers et al. | 455/414.1 |
| 7,177,641 B1 * | 2/2007 | Miernik et al. | 455/435.1 |
| 7,177,642 B2 * | 2/2007 | Sanchez Herrero et al. | 455/435.1 |
| 7,187,678 B2 * | 3/2007 | Cunetto et al. | 370/395.2 |

| Patent No. | Date | Inventor | Class |
|---|---|---|---|
| 7,190,969 B1 * | 3/2007 | Oh et al. | 455/551 |
| 7,197,308 B2 * | 3/2007 | Singhal et al. | 455/436 |
| 7,200,112 B2 * | 4/2007 | Sundar et al. | 370/230 |
| 7,200,126 B2 * | 4/2007 | Lim | 370/331 |
| 7,200,395 B2 * | 4/2007 | Backes | 455/435.2 |
| 7,221,943 B2 * | 5/2007 | Backes | 455/435.2 |
| 7,228,133 B2 * | 6/2007 | Rink et al. | 455/433 |
| 7,230,951 B2 * | 6/2007 | Mizell et al. | 370/401 |
| 7,236,781 B2 * | 6/2007 | Patil et al. | 455/432.1 |
| 7,239,861 B2 * | 7/2007 | Holur | 455/405 |
| 7,242,932 B2 * | 7/2007 | Wheeler et al. | 455/435.1 |
| 7,248,851 B2 * | 7/2007 | Lee et al. | 455/401 |
| 7,251,496 B2 * | 7/2007 | Thubert et al. | 455/517 |
| 7,263,371 B2 * | 8/2007 | Das et al. | 455/456.1 |
| 7,269,173 B2 * | 9/2007 | Iyer et al. | 370/395.31 |
| 7,269,445 B2 * | 9/2007 | Natsuno et al. | 455/558 |
| 7,277,711 B2 * | 10/2007 | Nyu | 455/456.1 |
| 7,277,735 B1 * | 10/2007 | Oh et al. | 455/567 |
| 7,280,500 B2 * | 10/2007 | Semper et al. | 370/328 |
| 7,280,533 B2 * | 10/2007 | Khartabil et al. | 370/352 |
| 7,280,827 B2 * | 10/2007 | Shimbori | 455/433 |
| 7,286,512 B1 * | 10/2007 | Borella | 370/338 |
| 7,286,796 B2 * | 10/2007 | Izumi | 455/41.1 |
| 7,286,814 B2 * | 10/2007 | Watanabe et al. | 455/404.2 |
| 7,299,030 B2 * | 11/2007 | Jung | 455/406 |
| 7,302,264 B2 * | 11/2007 | Yoon et al. | 455/436 |
| 7,305,429 B2 * | 12/2007 | Borella | 709/203 |
| 7,310,525 B2 * | 12/2007 | Takase et al. | 455/435.2 |
| 7,324,805 B2 * | 1/2008 | Nakakita et al. | 455/411 |
| 7,328,014 B2 * | 2/2008 | Takeda et al. | 455/435.1 |
| 7,328,044 B2 * | 2/2008 | Sugimoto et al. | 455/558 |
| 7,336,777 B2 * | 2/2008 | Lee et al. | 379/207.08 |
| 7,336,949 B2 * | 2/2008 | Nasielski | 455/435.1 |
| 7,340,217 B2 * | 3/2008 | Yamamoto et al. | 455/67.11 |
| 7,340,252 B2 * | 3/2008 | Fingerhut et al. | 455/435.1 |
| 7,342,903 B2 * | 3/2008 | O'Neill et al. | 370/331 |
| 7,343,158 B2 * | 3/2008 | Mizell et al. | 455/435.1 |
| 7,343,159 B2 * | 3/2008 | Saito et al. | 455/435.1 |
| 7,346,039 B2 * | 3/2008 | Oishi | 370/338 |
| 7,346,684 B2 * | 3/2008 | Borella | 709/225 |
| 7,352,866 B2 * | 4/2008 | Panjwani et al. | 380/270 |
| 7,356,330 B2 * | 4/2008 | Whittington et al. | 455/411 |
| 7,356,353 B2 * | 4/2008 | Sugaya | 455/557 |
| 7,362,730 B2 * | 4/2008 | Patterson et al. | 370/331 |
| 7,366,509 B2 * | 4/2008 | Akgun et al. | 455/435.1 |
| 7,366,533 B2 * | 4/2008 | Biggs et al. | 455/509 |
| 7,369,853 B2 * | 5/2008 | Son et al. | 455/436 |
| 7,372,835 B2 * | 5/2008 | Lee et al. | 370/331 |
| 7,373,103 B2 * | 5/2008 | Sato et al. | 455/7 |
| 7,379,738 B2 * | 5/2008 | Balasubramanian et al. | 455/435.1 |
| 7,391,754 B2 * | 6/2008 | Bae et al. | 370/331 |
| 7,392,049 B2 * | 6/2008 | Rajkotia et al. | 455/435.2 |
| 7,392,058 B2 * | 6/2008 | Hirota et al. | 455/550.1 |
| 7,398,094 B2 * | 7/2008 | Forrester | 455/456.5 |
| 7,418,252 B2 * | 8/2008 | Erskine et al. | 455/405 |
| 7,428,227 B2 * | 9/2008 | Park et al. | 370/331 |
| 7,436,809 B2 * | 10/2008 | Harada et al. | 370/338 |
| 7,436,848 B1 * | 10/2008 | Lewis et al. | 370/462 |
| 7,437,169 B2 * | 10/2008 | Khoury et al. | 455/466 |
| 7,437,479 B2 * | 10/2008 | Ishiyama et al. | 709/245 |
| 7,440,433 B2 * | 10/2008 | Rink et al. | 370/338 |
| 7,444,148 B1 * | 10/2008 | Cook | 455/435.1 |
| 7,454,206 B1 * | 11/2008 | Phillips et al. | 455/435.1 |
| 7,471,634 B1 * | 12/2008 | Wenzel et al. | 370/241 |
| 7,480,500 B1 * | 1/2009 | Mittal | 455/403 |
| 7,480,509 B2 * | 1/2009 | Kang et al. | 455/442 |
| 7,483,697 B2 * | 1/2009 | Ohki | 455/432.1 |
| 7,496,102 B2 * | 2/2009 | Chow et al. | 370/400 |
| 7,499,990 B1 * | 3/2009 | Tai et al. | 709/223 |
| 7,505,775 B2 * | 3/2009 | Ryu et al. | 455/458 |
| 7,505,776 B2 * | 3/2009 | Ryu et al. | 455/458 |
| 7,519,363 B2 * | 4/2009 | Shin et al. | 455/432.1 |
| 7,519,368 B2 * | 4/2009 | Lim et al. | 455/436 |
| 7,522,570 B2 * | 4/2009 | Kim et al. | 370/338 |
| 7,529,230 B2 * | 5/2009 | Lewis et al. | 370/352 |
| 7,529,541 B2 * | 5/2009 | Cho et al. | 455/414.1 |
| 7,529,823 B2 * | 5/2009 | Trufinescu et al. | 709/223 |
| 7,545,766 B1 * | 6/2009 | Muhanna et al. | 370/328 |
| 7,546,372 B2 * | 6/2009 | Allen et al. | 709/229 |
| 7,554,942 B2 * | 6/2009 | Joong et al. | 370/328 |
| 7,554,951 B2 * | 6/2009 | Park et al. | 370/331 |
| 7,561,555 B2 * | 7/2009 | Abrol et al. | 370/338 |
| 7,564,824 B2 * | 7/2009 | O'Neill | 370/338 |
| 7,565,145 B2 * | 7/2009 | Gallagher et al. | 455/436 |
| 7,567,804 B1 * | 7/2009 | Mangal | 455/435.1 |
| 7,580,707 B2 * | 8/2009 | Shaheen et al. | 455/426.1 |
| 7,586,913 B2 * | 9/2009 | Okubo et al. | 370/390 |
| 7,587,221 B2 * | 9/2009 | Mishina et al. | 455/524 |
| 7,590,708 B2 * | 9/2009 | Hsu | 709/218 |
| 7,593,731 B2 * | 9/2009 | Lim et al. | 455/436 |
| 7,596,118 B2 * | 9/2009 | Kim et al. | 370/330 |
| 7,606,227 B2 * | 10/2009 | Fukushima et al. | 370/390 |
| 7,606,351 B2 * | 10/2009 | Niwa | 379/88.12 |
| 7,606,568 B2 * | 10/2009 | Gallagher et al. | 455/436 |
| 7,610,049 B2 * | 10/2009 | Watanabe | 455/436 |
| 7,613,456 B2 * | 11/2009 | Chatterjee et al. | 455/435.1 |
| 7,616,598 B2 * | 11/2009 | Chang et al. | 370/328 |
| 7,623,499 B2 * | 11/2009 | Yahagi | 370/338 |
| 7,623,862 B2 * | 11/2009 | Backes | 455/436 |
| 7,623,864 B2 * | 11/2009 | Kang et al. | 455/438 |
| 7,630,714 B2 * | 12/2009 | Clark et al. | 455/435.1 |
| 7,633,904 B2 * | 12/2009 | Venkatachalam | 370/331 |
| 7,636,569 B2 * | 12/2009 | Le et al. | 455/435.1 |
| 7,646,753 B2 * | 1/2010 | Islam et al. | 370/338 |
| 7,647,040 B2 * | 1/2010 | Kim | 455/420 |
| 7,649,867 B2 * | 1/2010 | Kim et al. | 370/331 |
| 7,650,141 B2 * | 1/2010 | Patterson et al. | 455/414.1 |
| 7,653,036 B2 * | 1/2010 | Cohen | 370/338 |
| 7,660,584 B2 * | 2/2010 | Maxwell et al. | 455/436 |
| 7,664,458 B2 * | 2/2010 | Ishii et al. | 455/7 |
| 7,664,480 B2 * | 2/2010 | Kim et al. | 455/343.2 |
| 7,664,483 B2 * | 2/2010 | Annoni et al. | 455/406 |
| 7,672,317 B2 * | 3/2010 | Gateva et al. | 370/401 |
| 7,676,223 B2 * | 3/2010 | Das et al. | 455/422.1 |
| 7,684,794 B1 * | 3/2010 | Leung et al. | 455/432.3 |
| 7,684,796 B2 * | 3/2010 | Mizukoshi | 455/433 |
| 7,693,513 B2 * | 4/2010 | Chou | 455/418 |
| 7,701,896 B1 * | 4/2010 | Chowdhury et al. | 370/328 |
| 7,701,947 B2 * | 4/2010 | Cunetto et al. | 370/395.2 |
| 7,706,395 B2 * | 4/2010 | Inoue et al. | 370/432 |
| 7,710,931 B2 * | 5/2010 | Islam et al. | 370/338 |
| 7,711,383 B2 * | 5/2010 | Namm et al. | 455/519 |
| 7,715,466 B1 * | 5/2010 | Oh et al. | 375/211 |
| 7,715,829 B2 * | 5/2010 | Li et al. | 455/417 |
| 7,715,842 B2 * | 5/2010 | Kim et al. | 455/436 |
| 7,720,473 B2 * | 5/2010 | Kim et al. | 455/432.1 |
| 7,720,476 B2 * | 5/2010 | Narayanan et al. | 455/435.1 |
| 7,724,706 B2 * | 5/2010 | Kang et al. | 370/331 |
| 7,734,922 B2 * | 6/2010 | Lee et al. | 713/171 |
| 7,738,488 B2 * | 6/2010 | Marsico et al. | 370/466 |
| 7,738,868 B2 * | 6/2010 | Bajar et al. | 455/435.1 |
| 7,738,886 B1 * | 6/2010 | Connolly et al. | 455/461 |
| 7,742,765 B2 * | 6/2010 | Israelsson et al. | 455/436 |
| 7,751,820 B2 * | 7/2010 | Ishii et al. | 455/439 |
| 7,756,476 B2 * | 7/2010 | Suzuki | 455/41.2 |
| 7,761,102 B2 * | 7/2010 | Nyu | 455/456.2 |
| 7,773,974 B1 * | 8/2010 | Cermak et al. | 455/413 |
| 7,773,988 B2 * | 8/2010 | Jung et al. | 455/435.1 |
| 7,778,215 B2 * | 8/2010 | Xie et al. | 370/327 |
| 7,778,593 B2 * | 8/2010 | Hsu et al. | 455/3.04 |
| 7,778,640 B2 * | 8/2010 | Cho et al. | 455/435.1 |
| 7,783,281 B1 * | 8/2010 | Cook et al. | 455/410 |
| 7,783,421 B2 * | 8/2010 | Arai et al. | 701/211 |
| 7,787,879 B1 * | 8/2010 | Philips et al. | 455/435.1 |
| 7,792,081 B2 * | 9/2010 | Kim et al. | 370/331 |
| 7,796,990 B2 * | 9/2010 | Matuszewski et al. | 455/435.1 |
| 7,801,072 B2 * | 9/2010 | Son et al. | 370/328 |
| 7,804,795 B2 * | 9/2010 | Do et al. | 370/313 |
| 7,805,139 B2 * | 9/2010 | Shaheen et al. | 455/434 |
| 7,809,357 B2 * | 10/2010 | Hall et al. | 455/412.2 |
| 7,813,734 B2 * | 10/2010 | Kang et al. | 455/438 |
| 7,822,437 B2 * | 10/2010 | Barrow et al. | 455/552.1 |
| 7,826,826 B2 * | 11/2010 | Patterson et al. | 455/411 |
| 7,830,788 B2 * | 11/2010 | Oka | 370/218 |
| 7,835,324 B2 * | 11/2010 | Chowdhury et al. | 370/331 |
| 7,848,273 B2 * | 12/2010 | Son et al. | 370/311 |
| 7,848,751 B2 * | 12/2010 | Clark et al. | 455/435.1 |

| Patent | Kind | Date | Inventor | Class |
|---|---|---|---|---|
| 7,852,817 B2 * | 12/2010 | Gallagher et al. | 370/338 |
| 7,853,281 B2 * | 12/2010 | Das et al. | 455/522 |
| 7,860,061 B2 * | 12/2010 | Abrol et al. | 370/331 |
| 7,881,268 B1 * | 2/2011 | Tong | 370/338 |
| 7,885,231 B2 * | 2/2011 | Kim et al. | 370/331 |
| 7,885,659 B2 * | 2/2011 | Pummill et al. | 455/437 |
| 7,890,101 B2 * | 2/2011 | Yamakawa et al. | 455/433 |
| 7,912,004 B2 * | 3/2011 | Gallagher et al. | 370/329 |
| 7,912,450 B2 * | 3/2011 | Holur | 455/405 |
| 7,917,144 B2 * | 3/2011 | Fingerhut et al. | 455/435.1 |
| 7,920,523 B2 * | 4/2011 | Grinshpun et al. | 370/331 |
| 7,920,863 B2 * | 4/2011 | Xiang | 455/435.1 |
| 7,920,865 B2 * | 4/2011 | Bajar et al. | 455/435.1 |
| 7,920,868 B2 * | 4/2011 | Lim et al. | 455/436 |
| 7,924,756 B2 * | 4/2011 | Son et al. | 370/311 |
| 7,936,722 B2 * | 5/2011 | Yegani et al. | 370/331 |
| 7,937,084 B2 * | 5/2011 | Okubo et al. | 455/433 |
| 7,937,088 B2 * | 5/2011 | Nanda | 455/445 |
| 7,937,743 B2 * | 5/2011 | Park et al. | 726/1 |
| 7,940,733 B2 * | 5/2011 | Cho et al. | 370/338 |
| 7,941,140 B2 * | 5/2011 | Grayson et al. | 455/432.1 |
| 7,945,265 B2 * | 5/2011 | Yoon et al. | 455/436 |
| 7,957,738 B2 * | 6/2011 | Rey et al. | 455/435.1 |
| 7,961,678 B2 * | 6/2011 | Lim et al. | 370/329 |
| 7,961,681 B2 * | 6/2011 | Wu et al. | 370/329 |
| 7,961,685 B2 * | 6/2011 | Suh et al. | 370/331 |
| 7,966,406 B2 * | 6/2011 | Rosenberg | 709/227 |
| 7,969,945 B2 * | 6/2011 | Navali et al. | 370/331 |
| 7,974,247 B2 * | 7/2011 | Takatori et al. | 370/338 |
| 7,974,252 B2 * | 7/2011 | Lim et al. | 370/341 |
| 7,978,638 B2 * | 7/2011 | Kim et al. | 370/311 |
| 7,978,655 B2 * | 7/2011 | Taniuchi et al. | 370/331 |
| 7,979,564 B2 * | 7/2011 | Breau et al. | 709/228 |
| 7,983,242 B2 * | 7/2011 | Nasielski et al. | 370/352 |
| 7,986,682 B2 * | 7/2011 | Lim et al. | 370/341 |
| 7,991,002 B2 * | 8/2011 | Lee et al. | 370/467 |
| 7,991,396 B2 * | 8/2011 | Wang et al. | 455/435.1 |
| 8,000,703 B2 * | 8/2011 | Takubo | 455/433 |
| 8,005,076 B2 * | 8/2011 | Gallagher et al. | 370/353 |
| 8,005,463 B2 * | 8/2011 | Cermak et al. | 455/413 |
| 2003/0147537 A1 * | 8/2003 | Jing et al. | 380/277 |
| 2006/0128385 A1 | 6/2006 | Lee et al. | |

FOREIGN PATENT DOCUMENTS

WO    WO 2005/076564    8/2005

* cited by examiner

METHOD AND SYSTEM FOR MANAGING MOBILITY OF AN ACCESS TERMINAL IN A MOBILE COMMUNICATION SYSTEM USING MOBILE IP

PRIORITY

This application claims the benefit under 35 U.S.C. §119 (a) of a Korean Patent Application filed in the Korean Intellectual Property Office on May 22, 2007 and assigned Serial No. 2007-49963, the disclosure of which is incorporated herein by reference.

BACKGROUND OF THE INVENTION

1. Field of the Invention

The present invention relates generally to a mobile communication system, and in particular, to a method and system for managing mobility of an Access Terminal (AT) and an authentication process in a mobile communication system supporting Mobile IP version 4 (Mobile IPv4).

2. Description of the Related Art

In general mobile communication systems such as $3^{rd}$ Generation Partnership Project 2 (3GPP2) Code Division Multiple Access (CDMA) 1x and Evolution Data Only (EV-DO), an Access Network (AN) manages many radio-related resources. A Packet Data Serving Node (PDSN), which is a separate entity of a Core Network (CN), performs a procedure related to packet data communication.

The foregoing conventional mobile communication systems have provided mobility using Mobile IPv4 and Mobile IPv6 in the mobile environment of an AT. However, the conventional Mobile IPv4 (MIPv4) methods are unsuitable for use in Ultra Mobile Broadband (UMB), which is an improved 3GPP2 scheme intending to send a greater amount of data at higher speeds. Therefore, a scheme for improving the conventional MIPv4 is now under discussion as a scheme for efficiently supporting UMB.

The MIPv4 method used in the conventional CDMA 1x or EV-DO system requires more time for call access and processing. In other words, compared with Simple IP, Mobile IP, though it provides the convenience of mobility, it suffers a time delay from an authentication process for mobility support, a call processing process, and database management in its access and call processing, and authentication process.

SUMMARY OF THE INVENTION

Accordingly, the present invention has been designed to address at least the problems and/or disadvantages in the prior art and to provide at least the advantages described below. An aspect of the present invention provides a method and system for ensuring fast mobility support for an Access Terminal (AT) and performing secure and efficient communication using an improved Mobile IP version 4 (MIPv4) in an evolved mobile communication system, including 3GPP2 UMB.

Another aspect of the present invention provides a method and system for efficiently performing address allocation and authentication, and call setup for an AT based on improved MIPv4 in an initial call setup process of a mobile communication system.

Another aspect of the present invention provides a method for performing MIPv4-based authentication and security using a Remote Authentication Dial-in User Service (RADIUS) or Diameter protocol in which Authentication, Authorization, and Accounting server (AAA) is used when Extensible Authentication Protocol (EAP) is used as a large security framework for access accept of an AT in a mobile communication system, provides a system for carrying out mobility support using MIPv4, and also provides an address allocation method therefor.

In accordance with an aspect of the present invention, there is provided a method for managing mobility of an Access Terminal (AT) in a mobile communication system using Mobile Internet Protocol version 4 (IPv4). The mobility management method includes, while performing an Access Authentication process in which an AT, an Access Network (AN), a Signaling Radio Network controller (SRNC), an Access Gateway (AG), and an Authentication, Authorization, and Accounting server (AAA) are involved, generating, by the AAA and the AT, a first key for mutual authentication between the AT and a Home Agent (HA), and generating, by the AAA and the AG, a second key for mutual authentication between the AG and the HA; generating, by the AG, a third key for mutual authentication between the AG and the AT; acquiring, from the AG, by the AT, a Care-of-Address (CoA) that the AT will use in a foreign network; sending, by the AT to the AG, a Registration Request message including at least one of a first Authentication Extension generated with the first key, a third Authentication Extension generated with the third key, a Home-of-Address (HoA) of the AT, an address of the HA, and the CoA; verifying, by the AG, the third Authentication Extension included in the Registration Request message received from the AT, using the third authentication key; after verification of the third Authentication Extension, sending, to the HA, by the AG, a Registration Request message including a second Authentication Extension generated with the second key; upon receipt of the Registration Request message from the AG, performing, by the HA, verification on the AT and the AG using the first and the second Authentication Extensions, respectively, and allocating an HoA of the AT when the verification is successfully completed and the HA is assigned to the AT; and sending, by the HA, a Registration Response message including the allocated HoA of the AT in response to the Registration Request message.

In accordance with another aspect of the present invention, there is provided a system for managing mobility of an Access Terminal (AT) in a mobile communication system using Mobile Internet Protocol version 4 (IPv4). The mobility management system includes an Authentication, Authorization, and Accounting server (AAA) for generating a first key for mutual authentication between a Home Agent (HA) and the AT, and generating a second key for mutual authentication between an Access Gateway (AG) and the HA, while performing an Access Authentication process in which the AT, an Access Network (AN), a Signaling Radio Network controller (SRNC), the AG and the AAA are involved; the AG for generating a third key for mutual authentication between the AG and the AT, sending a Care-of-Address (CoA) to be used in a foreign network to the AT, and upon receiving from the AT a Registration Request message including at least one of the CoA, a first Authentication Extension generated with the first key, a third Authentication Extension generated with the third key, a Home-of-Address (HoA) of the AT, and an HA address, verifying the third Authentication Extension included in the Registration Request message using the third key and then sending a second Authentication Extension for mutual authentication between the AG and the HA along with the Registration Request message; the HA for, upon receiving the Registration Request message via the AG, verifying the first Authentication Extension using the first key acquired from the AAA, verifying the second Authentication Extension using the second key, and allocating a HoA of the AT to the AT; and the AT for generating the first key for mutual authentication between the AT and the HA, generating the third key for mutual authentication between the AT and the AG, receiving from the AG a CoA that the AT will use in a foreign network, sending to the AG a Registration Request message including at least one of the CoA, the first Authentication Extension generated with the first key, a third Authentication Extension generated with the third key, the HoA of the AT, and the HA address, and receiving from the AG a Registration Response message in response to the Registration Request message including the HoA allocated to the AT.

In accordance with another aspect of the present invention, there is provided a method for managing mobility of an Access Terminal (AT) in a Home Agent (HA) of a mobile communication system using Mobile Internet Protocol version 4 (IPv4). The mobility management method includes receiving, from the AT, a Registration Request message including at least one of a first Authentication Extension that an Access Gateway (AG) that received the Registration Request message has generated using a first key for mutual authentication between the AT and the HA, a second Authentication Extension generated using a second key for mutual authentication between the AG and the HA, a Home-of-Address (HoA) of the AT, an HA address, and a Care-of-Address (CoA) allocated from the AG; acquiring the first key and the second key from an Authentication, Authorization, and Accounting server (AAA); verifying the first Authentication Extension included in the Registration Request message using the first key acquired from the AAA, and verifying the second Authentication Extension included in the Registration Request message using the second key; registering mobility-related information of the AT after verification of the first Authentication Extension and the second Authentication Extension; and sending, to the AT, a Registration Response message including at least one of a HoA to be used by the AT and the CoA in response to the Registration Request message.

In accordance with another aspect of the present invention, there is provided a method for managing mobility of an Access Terminal (AT) in a mobile communication system that includes the AT, an Access Gateway (AG) through which the AT accesses a packet data network, and an Authentication, Authorization, and Accounting server (AAA) for performing authentication on the AT, and uses Mobile Internet Protocol version 4 (IPv4). The mobility management method includes, after an Access Authentication process in which the AAA is involved is performed, receiving from the AT by the AG a Registration Request message including relevant information for authentication check and mobility management for the AT; relaying, by the AG, the Registration Request message of the AT to the HA; verifying, by the HA, authentication-related information of the AT, and registering relevant information for mobility management of the AT; and sending, by the HA, a Registration Response message indicating the registration of the AT to the AT via the AG in response to the Registration Request message.

BRIEF DESCRIPTION OF THE DRAWINGS

The above and other aspects, features, and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will now be described in detail with reference to the annexed drawings. In the following description, a detailed description of known functions and configurations incorporated herein has been omitted for clarity and conciseness. The terms used herein are defined based on functions in the present invention and may vary according to users, operator intention, or usual practices. Therefore, the definition of the terms should be made based on contents throughout the specification.

The present invention, as described below, is directed to providing an address setting (or address allocation), a call setup, and a security method for a MIPv4-based Access Terminal (AT) in a mobile communication system. Although a detailed description of the present invention will be given herein with reference to a 3GPP2-based UMB system, by way of example, the present invention can be applied to other systems, such as an Evolved Packet Core (EPC), which is an evolved 3GPP mobile communication system, or to an evolved Worldwide Interoperability for Microwave Access (WiMAX) system. Therefore, it will be understood by those skilled in the art that the proposed Internet communication method based on Mobile IPv4 in mobile communication can be applied even to other mobile communication systems having the similar technical background and channel format with a slight modification without departing from the spirit and scope of the invention.

Figure 1:
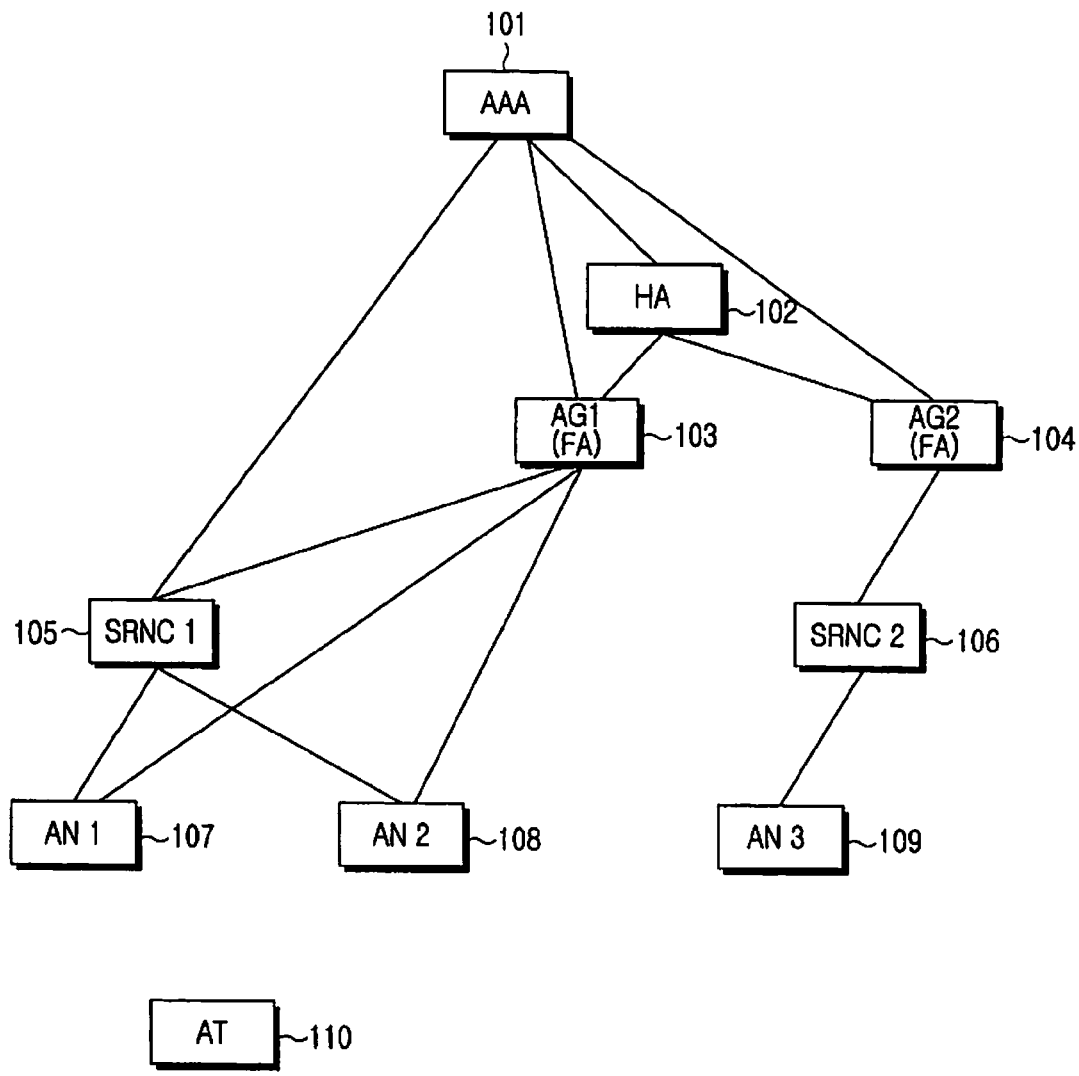
FIG. 1 is a block diagram illustrating a mobile communication system environment according to a preferred embodiment of the present invention.

FIG. 1 is a block diagram illustrating a mobile communication system environment according to a preferred embodiment of the present invention. More specifically, FIG. 1 illustrates a network configuration of a 3GPP2 UMB system by way of example.

Referring to FIG. 1, Access Networks (ANs) 107, 108, and 109 each set up a radio connection with an Access Terminal (AT) 110 located in their service areas or cells, and communicate using the set radio connection. Signaling Radio Network controllers (SRNCs) 105 and 106, when the AT 110 is in an idle mode, control the communication of the AT 110 via the ANs 107, 108, and 109. The AT 110 accesses a packet data network such as the Internet by way of Access Gateways (AGs) 103 and 104. The AGs 103 and 104 each include a Foreign Agent (FA) function (not shown) for controlling an access to a packet data network by an AT that has moved from another network (old home network) to an area of the network (new home network) managed by the AGs 103 and 104.

A Home Agent (HA) 102 and an Authentication, Authorization, and Accounting server (AAA) 101 are shown herein as the major network entities of the packet data network. When an authenticator (not shown) for authentication is included in the SRNCs 105 and 106, the SRNCs 105 and 106 will be used for authentication through interfaces with the AAA 101 as proposed herein.

Interfaces for managing mobility of an AT in the idle state are present between the ANs 107-109 and the SRNCs 105 and 106, and between the AGs 103 and 104 and the SRNCs 105 and 106. Data paths are present between the AGs 103 and 104 and the ANs 107-109. For authentication of the AT, an authenticator is situated in each of the SRNCs 105 and 106. Although a description of the present invention will be given herein on the assumption that the AGs 103 and 104 and the SRNCs 105 and 106 are each realized with a single physical entity to perform the authentication, if proper interfaces are present between the AGs 103 and 104 and the SRNCs 105 and 106 even when the SRNCs 105 and 106 are provided as independent physical entities, the AGs 103 and 104 and the SRNCs 105 and 106 may operate as if they are realized in a single entity.

The AT 110 provided herein is an AT having a MIPv4 protocol stack, and can issue a request for setup of an HA through an initial call setup process of MIPv4. Upon receipt of the Registration Request message in the call setup process, the HA, as it becomes an HA assigned to the AT, can perform a process for allocating a Home-of-Address (HoA) of the AT.

Figure 2A:
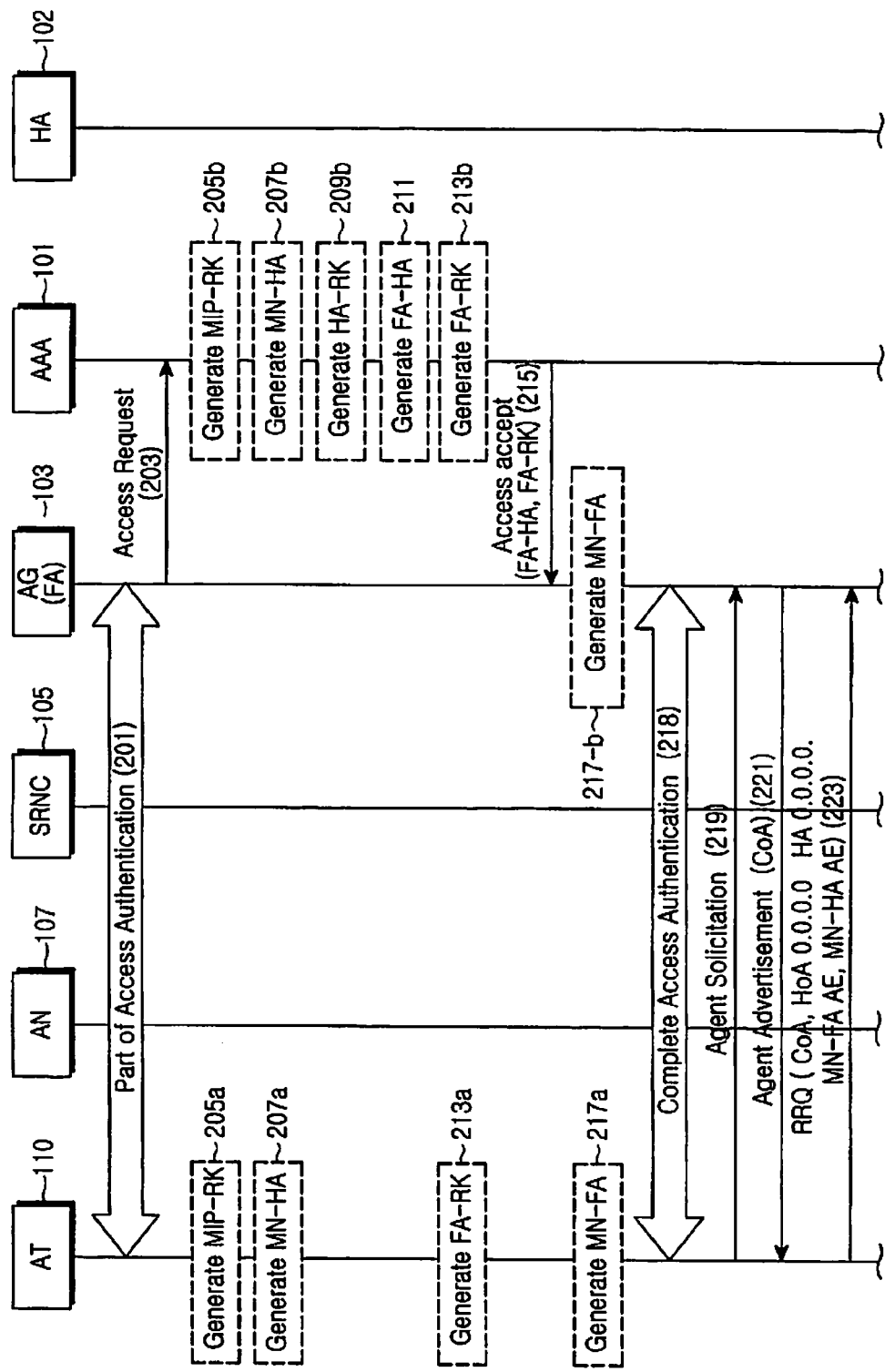
FIGS. 2A and 2B are message flow diagrams illustrating an access, address allocation, and authentication procedure for an AT according to an embodiment of the present invention.
Figure 2B:
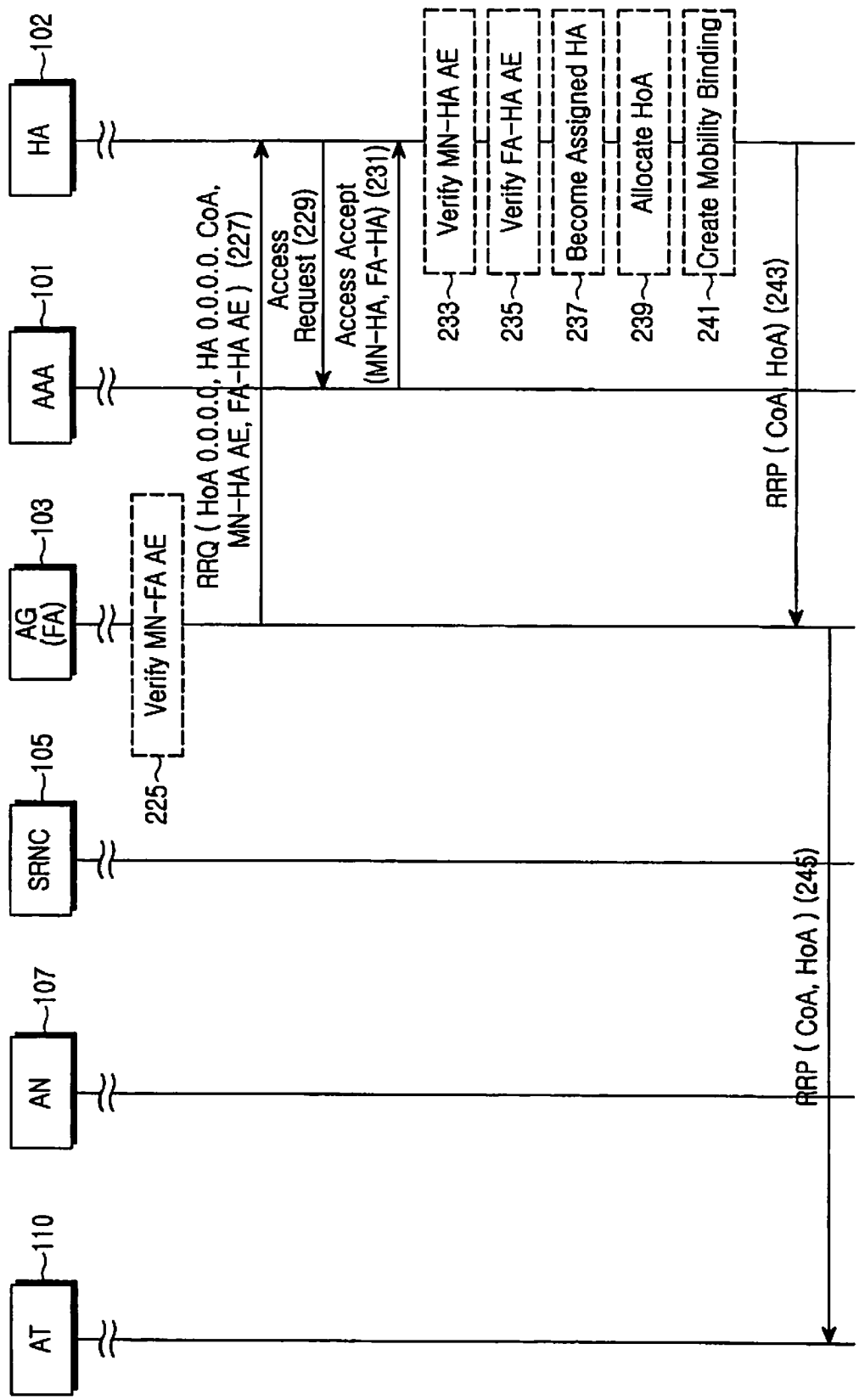

FIGS. 2A and 2B are message flow diagrams illustrating an address setting (or address allocation), a call setup, and an authentication procedure for an AT according to an embodiment of the present invention. In step 201, AT 110, AN 107, SRNC 105, and AG 103 perform a part of an Access Authentication process for the AT 110. Several procedures and several entities are involved in step 201, and because the basic operations of the entities, except for the address allocation, access, and authentication procedure, are not closely related to the present invention, a detailed description thereof will be omitted herein.

Thereafter, in step 203, the AG 103 sends an Access Request message to an AAA 101 to notify reception of an access authentication request from the AT 110. The Access Request message is an AAA Access Request message, such as an Access Request message based on Remote Authentication Dial-in User Service (RADIUS) protocol and/or an Access Request message based on Diameter AAA protocol.

In steps 205 to 217, AT 110, AAA 101, and AG 103 generate security keys to be used for authenticating each other, and because the detailed security key generation method is not closely related to the present invention, a description thereof will be omitted herein for simplicity. In steps 205a and 205b, the AT 110 and the AAA 101 each generate a root key or a Mobile IP-Root Key (MIP-RK) to be used for the entire authentication process for Mobile IP-based authentication, and can generate, from the generated MIP-RK key, at least one of a key for mutual authentication between a Mobile Node and an HA (hereinafter MN-HA authentication), a root key for mutual authentication between an FA and an HA (hereinafter FA-HA authentication), and a root key for mutual authentication between an MN and an FA (hereinafter MN-FA mutual authentication).

In steps 207a and 207b, the AT 110 and the AAA 101 each can generate, from the generated MIP-RK, a Mobile Node-Home Agent (MN-HA) key for mutual authentication between the AT 110 and the HA 102, or can generate the MN-HA key in another method, a description of which will be omitted herein.

In step 209b, the AAA 101 generates a Home Agent-Root Key (HA-RK). Regarding this key, the AAA 101 can generate HA-RK from the MIP-RK, or can generate HA-RK according to its own separate rule, a detailed description thereof will be omitted herein.

The HA-RK generated in step 209b will be used in step 211 by the AAA 101 as a root key necessary for generating an FA-HA key for mutual authentication between the AG 103 and the HA 102. For example, the FA-HA key generation method generates the FA-HA key using the HA-RK generated in step 209b as a root key, and in this case, the FA-HA key can be used for mutual authentication between the AG 103 and the HA 102.

In steps 213a and 213b, the AT 110 and the AAA 101 each generate a Foreign Agent-Root Key (FA-RK), and this key can be used later in steps 217a and 217b by the AT 110 and the AG 103 to generate an MN-FA key necessary for mutual authentication therebetween.

In step 215, the AAA 101 sends an Access Accept message to the AG 103 in response to the Access Request message received in step 203. The Access Accept message includes, during its transmission, at least one of the FA-HA key generated in step 211 and the FA-RK key generated in step 213b. The Access Accept message as used herein refers to both a RADIUS Access Accept message and a Diameter Access Answer message.

In steps 217a and 217b, the AT 110 and the AG 103 each generate an MN-FA key for mutual authentication between the AT 110 and the AG 103. For example, in the MN-FA key generation method, the AT 110 and the AG 103 can generate the MN-FA key by using the FA-RK generated in steps 213a and 213b as a root key, and a detailed description thereof will be omitted herein.

Thereafter, in step 218, the AT 110, the AN 107, the SRNC 105, and the AG 103 complete an Extensible Authentication Protocol (EAP)-based Access Authentication process. Several procedures and several entities (e.g., AT, AN, SRNC, AG, etc.) are involved in step 218, and because this is not closely related to the present invention, a detailed description thereof will be omitted.

Although it is assumed herein that the AT 110 generates the MIP-RK, MN-HA, FA-RK, and MN-FA keys in steps 205a, 207a, 213a, and 217a, respectively, the AT 110 may alternatively generate the root keys and the keys to be used for mutual authentication after completion of Access Authentication, i.e., after step 218. That is, the AT 110 may perform steps 205a, 207a, 213a, and 217a, after step 218.

In step 219, the AT 110 sends an Agent Solicitation message to the AG 103 to search for an FA necessary for generation of a Care-of-Address (CoA). In step 221, the AG 103, when it has an FA function, generates CoA and sends the generated CoA to the AT 110 along with an Agent Advertisement message.

In step 223, the AT 110 sends to the AG 103 a Registration Request (RRQ) message including relevant information for authentication check and mobility management for the AT 110. The RRQ message includes therein at least one of the CoA acquired in step 221, HoA 0.0.0.0, given by setting HoA of an AT as 0.0.0.0 to request HoA allocation for the AT 110, HA 0.0.0.0, given by setting an address of an HA as 0.0.0.0 to search for the assigned HA 102, Authentication Extension MN-FA AE for mutual authentication between the AT 110 and the AG 103, generated using the MN-FA key generated in step 217a, and MN-HA AE information for mutual authentication between the AT 110 and the HA 102, generated using the MN-HA key generated in step 207a.

The CoA is a temporary address that an AT will use in a foreign network. HoA 0.0.0.0 is an address given by temporarily setting HoA of AT as 0.0.0.0, and HA 0.0.0.0 is an address given by temporarily setting an address of HA as 0.0.0.0. The AT 110 sets all the information as 0.0.0.0 before transmission to request allocation of HA and HoA.

In step 223, the AT 110 sends the RRQ message to request an HA 102 that received the RRQ message to be an HA 102 assigned to the AT 110. Further, the AT 110 generates, from the MN-FA key generated in step 217a, an Authentication Extension MN-FA AE to be used later in call processing for mutual authentication between the AT 110 and the AG 103, generates, from the MN-HA key, an Authentication Extension MN-HA AE to be used later for mutual authentication between the AT 110 and the HA 102, and sends the generated MN-FA AE and MN-HA AE along with the RRQ message.

Upon receipt of the RRQ message from the AT 110, the AG 103 verifies the MN-FA AE using its own MN-FA key in step 225, performing mutual verification between the AT 110 and the AG 103.

After a successful verification in step 225, the AG 103 sends an RRQ message to the HA 102 in step 227, and in this case, the RRQ message, unlike the RRQ message used in step 223, further includes an FA-HA AE generated with the FA-HA key, in addition to the HoA, HA address, CoA, and MN-HA AE. Therefore, the RRQ message sent in step 227 includes at least one of an HoA, an HA address, a CoA, an MN-HA AE, and an FA-HA AE. In the foregoing, the CoA is a temporary address that the AT 110 will use in a foreign network, and the AG 103 sends to the AT 110 an intact AT's HoA being set as 0.0.0.0 in the RRQ message received from the AT 110, along with the CoA, and sends, to the HA 102, the intact HA address being set as 0.0.0.0 in the RRQ message received from the AT 110, thereby requesting an HA 102 that received the RRQ message to be an HA 102 assigned to the AT 110.

Regarding authentication, the AG 103 generates, from the FA-HA key received from the AAA 101 in step 215, an FA-HA AE to be used later for mutual authentication between the AG 103 and the HA 102, and an MN-HA AE included in the RRQ message, i.e., an MN-HA AE to be used later for mutual authentication between the AT 110 and the HA 102, and sends the generated FA-HA AE and MN-HA AE in the RRQ message.

Upon receiving the RRQ message in step 227, the HA 102 sends an Access Request message to the AAA 101, in step 229, to accept the AT 110, determining that the AT 110 is an authentication node authenticated by the AAA 101. In step 231, the AAA 101 sends at least one of the MN-HA key generated in step 207*b* and the FA-HA key generated in step 211, to the HA 102, along with an Access Accept message in response to the Access Request message.

Thereafter, in step 233, the HA 102 verifies the MN-HA AE, using the MN-HA key received in step 231. That is, in step 233, the HA 102 can determine whether the AT 110 is an authenticated AT by verifying the MN-HA AE information received in the RRQ message, using the MN-HA key received from the AAA 101. In step 235, the HA 102 verifies the FA-HA AE information received in the RRQ message using the FA-HA key received from the AAA 101, thereby accomplishing mutual verification between the AG 103 and the HA 102.

In step 237, the HA 102 determines if the HA 102 itself will become an HA assigned to the AT 110, recognizing that it has received a request for requesting the HA 102 to become an HA assigned to a corresponding AT because an HA address in the RRQ message received in step 227 is set as HA 0.0.0.0. That is, in step 237, the HA 102 registers relevant information for mobility management for the AT 110. However, a detailed description of the method for determining if the HA 102 becomes an HA assigned to the AT 110 will be omitted herein.

In step 239, the HA 102 allocates an HoA for the AT 110 if the HA 102 becomes an HA assigned to the AT 110. In step 241, the HA 102 creates a Mobility Binding, which is a database of a CoA and an HoA for the AT 110, to manage the future moving situation of the AT. Thereafter, in step 243, the HA 102 sends to the AG 103 a Registration Response (RRP) message targeting the AT 110. The HA 102 includes, in the RRP message, the HoA that the AT 110 will use, allocated in step 239, and the CoA that the AT 110 sent along with the RRQ message in step 223, and sends the RRP message, thereby notifying that HoA information of the AT to which an HA is assigned has been registered in the HA together with the CoA sent by the AT. Thereafter, in step 245, the AG 103 relays the RRP message received from the HA 102 to the AT 110.

Figure 3:
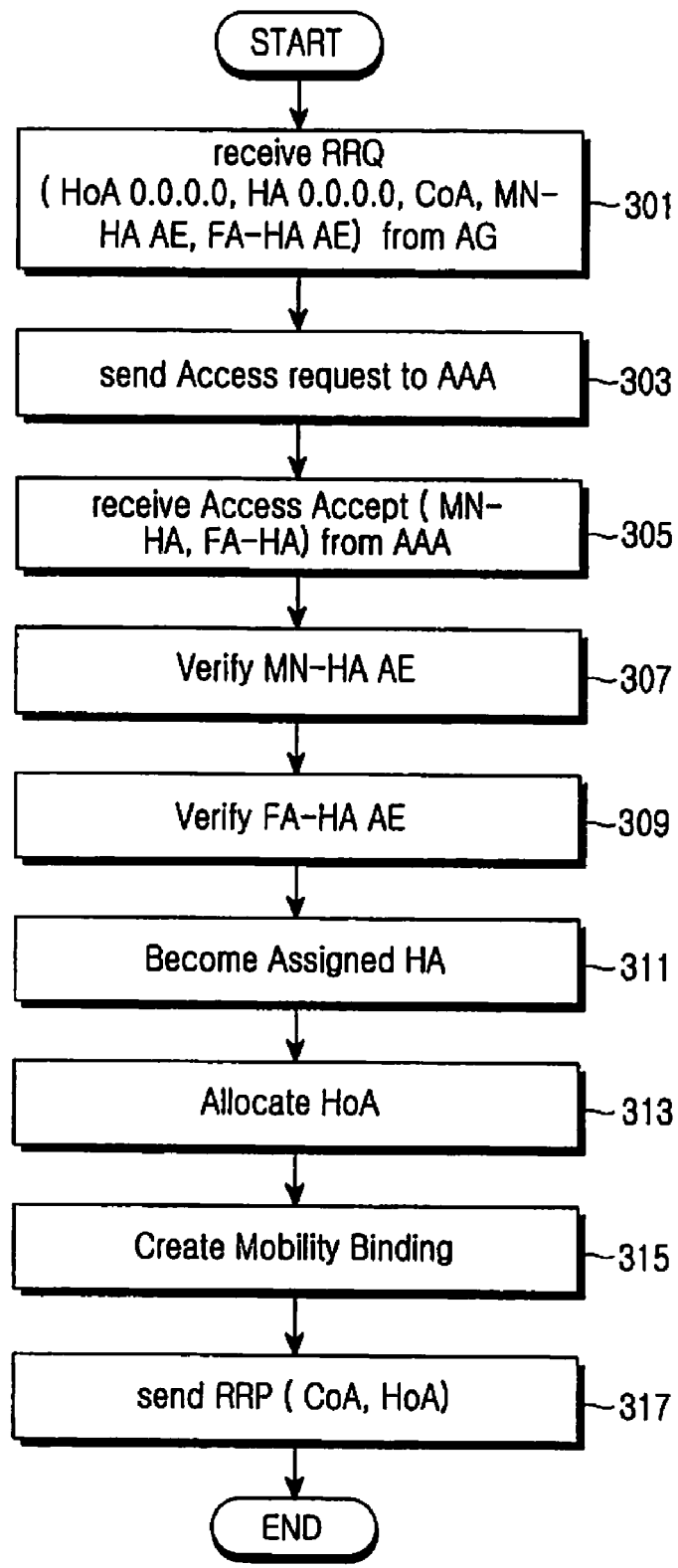
FIG. 3 is a flowchart illustrating an operation of an HA according to a preferred embodiment of the present invention.

FIG. 3 is a flowchart illustrating an operation of an HA 102 according to a preferred embodiment of the present invention. In step 301, an HA 102 receives an RRQ message of an AT, relayed from an AG 103. The received RRQ message includes at least one of an HoA, an HA address, a CoA, an MN-HA AE, and an FA-HA AE. The RRQ message is received at the HA 102 after a CoA, which is a temporary address that an AT 110 will use in a foreign network. An AT's HoA is temporarily set as 0.0.0.0. The RRQ message being received at the HA 102, after the HoA is set as 0.0.0.0, indicates that the HA 102 can allocate the HoA, and when an HA address included in the received RRQ message is set as 0.0.0.0, the HA 102 that received the RRQ message is requested to be assigned to the AT 110.

Regarding authentication, an MN-HA AE to be used later for mutual authentication between the AT 110 and the HA 102 can be generated from the FA-HA AE key and the MN-HA key, which are generate from the FA-HA key and will be used later for mutual authentication between AG 103 and the HA 102, and then can be included in the received RRQ message. The HA 102 receives the RRQ message sent from the AT 110, which is relayed from the AG 103 as described above.

The HA 102 sends an Access Request message for requesting access accept of an AT to an AAA 101 for access accept of the AT 110 in step 303, and receives an MN-HA key and an FA-HA key together through an Access Accept message in step 305. Thereafter, in step 307, the HA 102 verifies the MN-HA AE received in step 301 using the MN-HA key acquired in step 305. That is, in step 307, the HA 102 can determine if the AT 110 is an authenticated AT, by verifying the MN-HA AE information included in the received RRQ message using the MN-HA key received from the AAA 101.

In step 309, the HA 102 verifies the FA-HA AE information included in the received RRQ message using the FA-HA key received from the AAA 101, thereby mutually verifying the AG 103 and the HA 102. In step 311, the HA 102 can determine if the HA 102 itself is assigned to the AT 110, by checking if an HA address in the RRQ message received in step 301 is set as HA 0.0.0.0. In step 313, if the HA 102 is assigned to the AT 110, the HA 102 allocates an HoA for the AT 110, and creates a Mobility Binding of a CoA and an HoA for an AT in step 315, to manage the future moving situation of the AT. Thereafter, in step 317, the HA 102 sends an RRP message targeting the AT 110, to the AG 103, and the RRP message includes, during its transmission, an allocated HoA that the AT 110 will use, and includes the CoA that the AT 110 has sent in the RRQ message.

Figure 4:
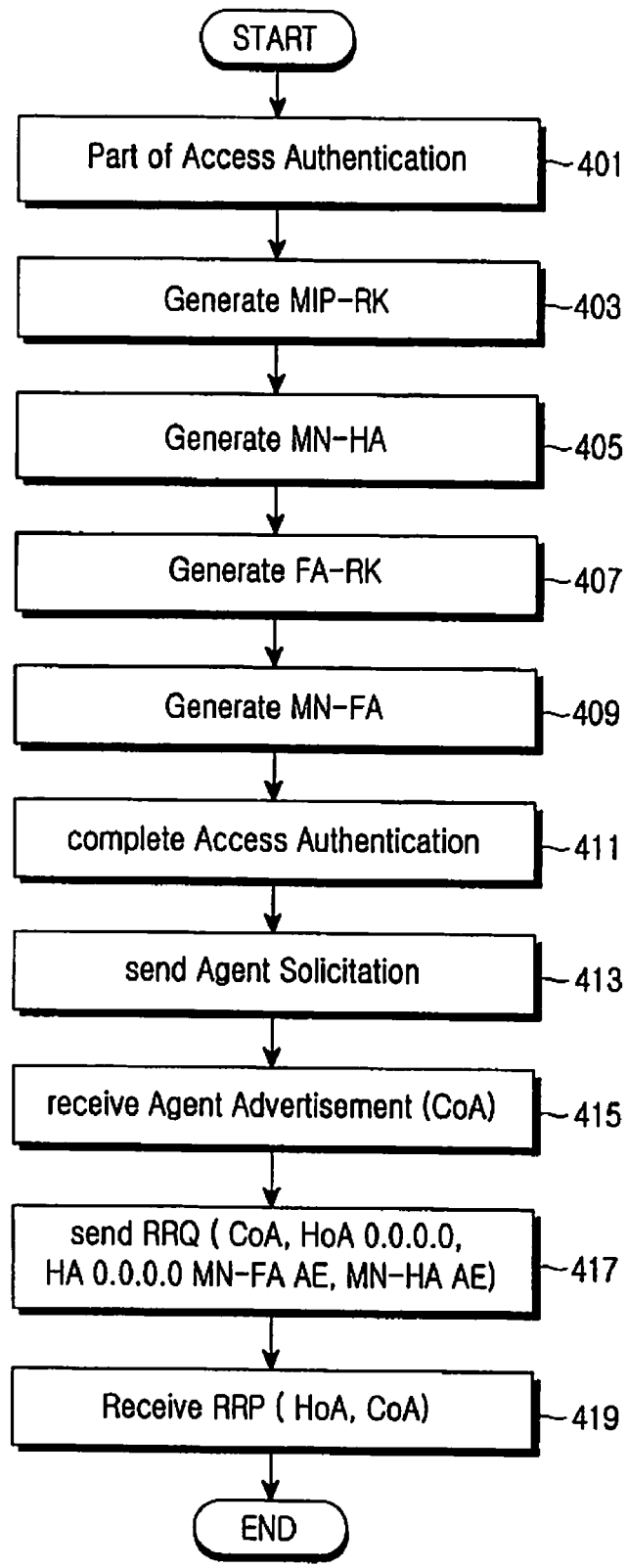
FIG. 4 is a flowchart illustrating an operation of an AT according to a preferred embodiment of the present invention.

FIG. 4 is a flowchart illustrating an operation of an AT 110 according to a preferred embodiment of the present invention. In step 401, an AT 110 performs a part of an Access Authentication process. However, because the Access Authentication process departs from the scope of the present invention, a detailed description thereof will be omitted herein.

In step 403, the AT 110 generates a root key MIP-RK to be used for the entire authentication process based on Mobile IP, and can generate, from this MIP-RK key, at least one of a key for MN-HA mutual authentication and a root key for MN-FA mutual authentication.

In step 405, the AT 110 generates, from the MIP-RK key, an MN-HA key for mutual authentication between the AT 110 and the HA 102. In step 407, the AT 110 generates an FA-RK, and the FA-RK key can be used later in step 409 when the AT 110 generates a MN-FA key necessary for mutual authentication between the AT 110 and the AG 103. In step 411, the AT 110 completes the Access Authentication process in which several entities such as AT 110, AG 103, SRNC 105, and AAA 101 are involved. Steps 403 to 409, which are performed by the AT 110, may be followed by step 411. Thereafter, in step 413, the AT 110 sends an Agent Solicitation message to the AG 103 to search for an FA for CoA generation. When the AG 103 has an FA function, the AG 103 generates a CoA and sends the CoA to the AT 110 along with an Agent Advertisement message. In step 415, the AT 110 receives the Agent Advertisement message with the CoA.

After receiving the Agent Advertisement message in step 415, the AT 110 sends an RRQ message to the AG 103 in step 417. The network entity that finally receives the RRQ message is the HA 102. The RRQ message includes at least one of a CoA, an HoA 0.0.0.0, an HA 0.0.0.0, an MN-FA AE, and an MN-HA AE information. Of the information included in the RRQ message sent in step 417, a CoA is a temporary address that the AT 110 will use in a foreign network, an HoA is set as 0.0.0.0 to request HoA allocation of the AT 110, and HA address is an address of the HA 102 to be assigned to the AT 110, and is set as 0.0.0.0 during its transmission to request an address of an HA to be assigned to the AT. Thereafter, in step 419, the AT 110 receives an RRP message from the HA 102 by means of relaying of the AG 103.

As is apparent from the foregoing description, the present invention can solve a call setup delay problem for an authentication process and data communication based on Mobile IPv4, and the time delay problem occurring in call re-setup due to movement of the AT, and also can efficiently perform IP address setting, and call setup-related authentication in a mobile communication system based on Mobile IPv4, thereby ensuring secure and efficient data communication.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for managing mobility of an Access Terminal (AT) in a mobile communication system using Mobile Internet Protocol version 4 (IPv4), the mobile communication system including an AT, an Access Network (AN), a Signaling Radio Network controller (SRNC), an Access Gateway (AG), and an Authentication, Authorization, and Accounting server (AAA), the method comprising:
   generating, during an Access Authentication process, by the AAA and the AT, a first key for mutual authentication between the AT and a Home Agent (HA);
   generating, by the AAA and the AG, a second key for mutual authentication between the AG and the HA;
   generating, by the AG, a third key for mutual authentication between the AG and the AT;
   acquiring, by the AT, a Care-of-Address (CoA) that the AT will use in a foreign network, from the AG;
   sending, by the AT to the AG, a Registration Request message including at least one of a first Authentication Extension generated with the first key, a third Authentication Extension generated with the third key, a Home-of-Address (HoA) of the AT, an address of the HA, and the CoA;
   verifying, by the AG, the third Authentication Extension included in the Registration Request message received from the AT, using the third authentication key;
   sending, by the AG to the HA, a Registration Request message including a second Authentication Extension generated with the second key;
   upon receipt of the Registration Request message from the AG, performing, by the HA, verification on the AT and the AG using the first and the second Authentication Extensions, respectively;
   allocating an HoA of the AT, when the verification is successfully completed and the HA is assigned to the AT; and
   sending, by the HA, a Registration Response message including the allocated HoA of the AT, in response to the Registration Request message.

2. The method of claim 1, further comprising:
   while performing the Access Authentication process, generating, by the AAA, a first root key to be used for a Mobile IP authentication process, and generating the first key using the first root key;
   generating, from the first root key, a second root key used for generating the second key;
   generating a third root key with which the AG generates the third key; and
   sending, to the AG, the third root key and an Access Accept message, in response to an Access Request message.

3. The method of claim 1, further comprising:
   while performing the Access Authentication process, generating, by the AT, a first root key to be used for a Mobile IP authentication process;
   generating the first key from the first root key; and
   generating a third root key used for generating the third key.

4. The method of claim 1, wherein allocating, by the HA, the HoA of the AT comprises:
   verifying first authentication information generated by the AT, received from the AG, using the first key received from the AAA;
   when the first authentication information is verified, verifying second authentication information included in the received Registration Request message, using the second key received from the AAA; and
   when the second authentication information is verified, determining if the HA itself is an HA to be assigned to the AT, based on an HA address included in the Registration Request message, and allocating an HoA of the AT to the AT, when the HA itself is the HA to be assigned to the AT.

5. A system for managing mobility of an Access Terminal (AT) in a mobile communication system using Mobile Internet Protocol version 4 (IPv4), the system comprising:
   a Home Agent (HA);
   an Access Network (AN);
   an Access Gateway;
   a Signaling Radio Network controller (SRNC);
   an Authentication, Authorization, and Accounting server (AAA) for generating a first key for mutual authentication between the HA and the AT, and generating a second key for mutual authentication between the AG and the HA, during an Access Authentication process in which the AT, the AN, the SRNC, the AG, and the AAA are involved;
   wherein the AG for generates a third key for mutual authentication between the AG and the AT, sends a Care-of-Address (CoA) to be used in a foreign network to the AT, and upon receiving from the AT a Registration Request message including at least one of the CoA, a first Authentication Extension generated with the first key, a third Authentication Extension generated with the third key, a Home-of-Address (HoA) of the AT, and an HA address, verifies the third Authentication Extension included in the Registration Request message using the third key, and sends a second Authentication Extension for mutual authentication between the AG and the HA, and the Registration Request message;

wherein the HA, upon receiving the Registration Request message via the AG, verifies the first Authentication Extension using the first key acquired from the AAA, verifies the second Authentication Extension using the second key, and allocates an HoA of the AT to the AT; and wherein the AT generates the first key for mutual authentication between the AT and the HA, generates the third key for mutual authentication between the AT and the AG, receives, from the AG, a CoA that the AT will use in a foreign network, sends, to the AG, a Registration Request message including at least one of the CoA, the first Authentication Extension generated with the first key, a third Authentication Extension generated with the third key, the HoA of the AT, and the HA address, and receives, from the AG, a Registration Response message, in response to the Registration Request message including the HoA allocated to the AT.

6. The system of claim 5, wherein the AAA generates a first root key to be used for a Mobile IP authentication process, generates the first key using the first root key, generates from the first root key a second root key used for generating the second key, generates a third root key with which the AG generates the third key, and sends, to the AG, the third root key and an Access Accept message, in response to an Access Request message.

7. The system of claim 5, wherein the AT generates a first root key to be used for a Mobile IP authentication process, generates the first key from the first root key, and generates a third root key used for generating the third key.

8. The system of claim 5, wherein the HA verifies first authentication information generated by the AT, received from the AG, using the first key received from the AAA, verifies second authentication information included in the received Registration Request message using the second key received from the AAA, when the first authentication information is verified, determines if the HA itself is an HA to be assigned to the AT based on the HA address in the Registration Request message, when the second authentication information is verified, and allocates an HoA to the AT when the HA itself is the HA to be assigned to the AT.

9. A method for managing mobility of an Access Terminal (AT) in a Home Agent (HA) of a mobile communication system using Mobile Internet Protocol version 4 (IPv4), the method comprising:

receiving, from the AT, a Registration Request message including at least one of a first Authentication Extension that an Access Gateway (AG) that received the Registration Request message has generated using a first key for mutual authentication between the AT and the HA, a second Authentication Extension generated using a second key for mutual authentication between the AG and the HA, a Home-of-Address (HoA) of the AT, an HA address, and a Care-of-Address (CoA) allocated from the AG;

acquiring the first key and the second key from an Authentication, Authorization, and Accounting server (AAA);

verifying the first Authentication Extension included in the Registration Request message using the first key acquired from the AAA;

verifying the second Authentication Extension included in the Registration Request message using the second key;

registering mobility-related information of the AT after verification of the first Authentication Extension and the second Authentication Extension; and sending, to the AT, a Registration Response message including at least one of an HoA to be used by the AT and the CoA, in response to the Registration Request message.

10. A method for managing mobility of an Access Terminal (AT) in a mobile communication system that includes the AT, an Access Gateway (AG) through which the AT accesses a packet data network, and an Authentication, Authorization, and Accounting server (AAA) for authenticating the AT, and uses Mobile Internet Protocol version 4 (IPv4), the method comprising:

performing an Access Authentication process utilizing the AAA;

receiving, by the AG, a Registration Request message including relevant information for authentication check and mobility management for the AT, from the AT;

relaying, by the AG to a Home Agent (HA), the Registration Request message of the AT;

verifying, by the HA, authentication-related information of the AT;

registering relevant information for mobility management of the AT; and sending, by the HA to the AT, via the AG, a Registration Response message indicating the registration of the AT, in response to the Registration Request message, wherein the Registration Request message that the AG receives from the AT includes at least one of a first Authentication Extension generated using a first key for mutual authentication between the AT and the HA, a third Authentication Extension generated using a third key for mutual authentication between the AG and the AT, a Home-of-Address (HoA) of the AT, an HA address, and a Care-of-Address (CoA) allocated from the AG, and wherein the Registration Request message that the AG relays to the HA, includes at least one of the first Authentication Extension generated using the first key for mutual authentication between the AT and the HA, a second Authentication Extension generated using a second key for mutual authentication between the AG and the HA, the HoA of the AT, the HA address, and the CoA allocated from the AG.

* * * * *